Jan. 25, 1938.    E. M. SPLAINE    2,106,282
OPHTHALMIC MOUNTING
Filed Sept. 21, 1934
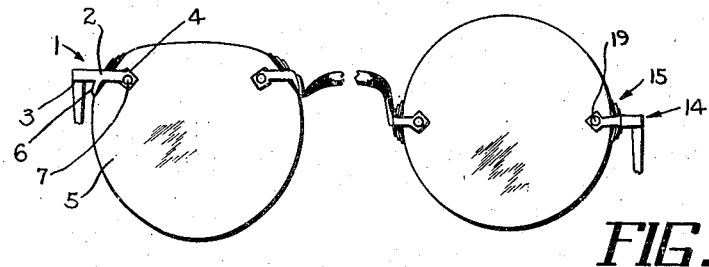
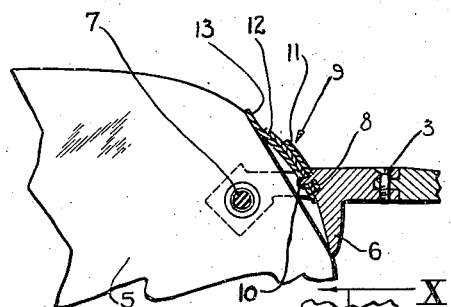
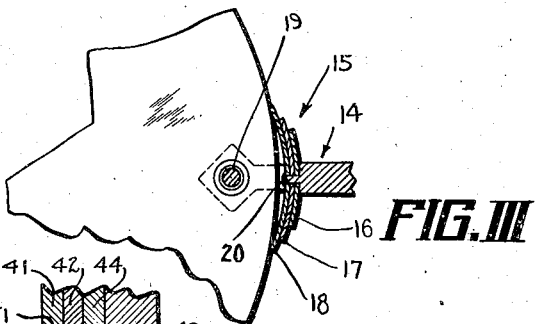
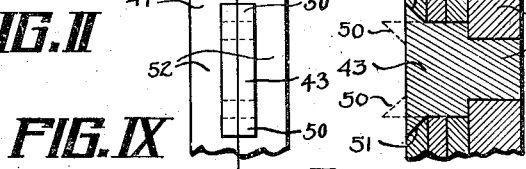
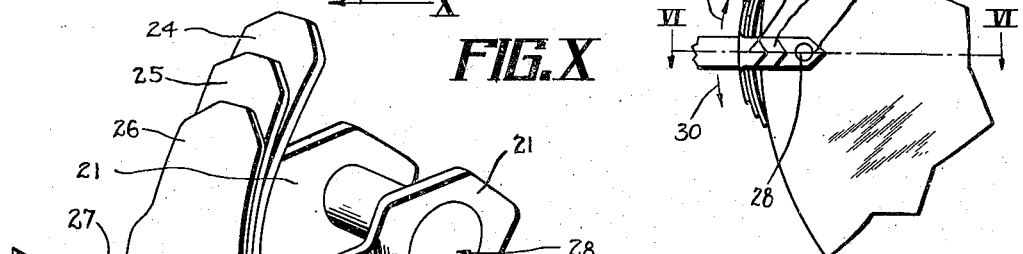
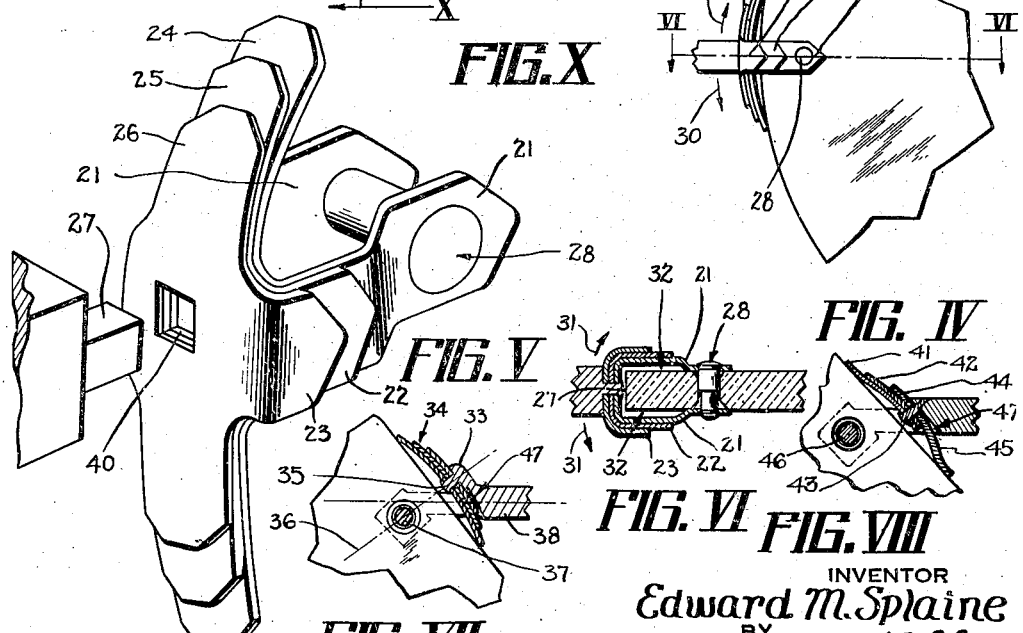
INVENTOR
Edward M. Splaine
BY
Harry H. Styll
ATTORNEY Patented Jan. 25, 1938

2,106,282

UNITED STATES PATENT OFFICE 2,106,282

OPHTHALMIC MOUNTING

Edward M. Splaine, Southbridge, Mass., assignor to American Optical Company, Southbridge, Mass., a voluntary association of Massachusetts Application September 21, 1934, Serial No. 744,917

14 Claims. (Cl. 88—47)

This invention relates to improvements in ophthalmic mountings and has particular reference to improved lens holding means and method of making the same.

One of the principal objects of the invention is to provide an improved lens holding means that will resiliently ease off the rigidity in the connection of holding means to the lens, that will insure the said holding means returning to its initial aligned position after such easing off, that will provide means for controlling the tension of the resilient means during use, that will maintain the connection of the holding means to the lens firm and substantially rigid to prevent looseness and play during the use of the mounting and yet be of such a nature as to relieve shocks and strain on the lenses when the glasses are dropped or roughly handled and that will eliminate the exactness and accurateness in the fitting of the parts to be connected usually in mountings of this character in the past.

Another object of the invention is to provide resilient means of the above character having a plurality of overlying sections, each of which forms a resilient backing support for the adjacent section, and each of which may be of equal or varied resiliency as desired.

Another object is to provide lens holding means of the above character which is resiliently supported so that it is free to move and absorb shocks and strains both in the direction of the plane of the lenses and in a direction substantially normal to the plane of said lenses.

Another object is to provide lens holding means of the above character so constructed that the tension of the resilient means may be varied as desired.

Another object is to provide lens holding means of the above character having a relatively rigid portion and a relatively resilient lens edge engaging portion, said resilient portion being formed of a plurality of overlying sections of the same resiliency or of varied resiliencies, as desired and being adapted to urge the relatively rigid portion into engagement with the periphery of the lens to maintain the parts in desired aligned relation with said lens, said rigid portion being adapted to provide means for varying the tension of the resilient means and also adapted to control the position of alignment of the lens holding means with the lens when the parts are connected.

Another object is to provide lens holding means having a part definitely shaped to produce a pleasing streamline effect horizontally of the lens in combination with edge engaging means for resiliency maintaining the said part in desired aligned relation with the lens in instances wherein the edge of the lens at the location of attachment of the holding means lies at an angle other than normal relative to the horizontal meridian of the lens and which will resiliently permit movement of the holding means both upwardly and downwardly with respect to its point of attachment to the lens to absorb shocks and strain in either direction.

Another object is to provide novel means and method of making lens holding means of the above character.

Other objects and advantages of the invention will become apparent from the following description taken in connection with the accompanying drawing, and it will be understood that many changes may be made in the arrangement of parts, details of construction and methods shown and described without departing from the spirit of the invention as set forth in the accompanying claims. I, therefore, do not wish to be limited to the exact arrangement of parts, details of construction and methods shown and described as the preferred forms only have been shown by way of illustration.

Referring to the drawing:

Figs. I and Ia are fragmentary front elevations of two different types of ophthalmic mountings embodying the invention and showing a portion of one mounting utilizing a high position strap or lens holding means and the other portion a low position strap or lens holding means;

Fig. II is a fragmentary enlarged view of the high positioned strap shown partially in section;

Fig. III is a view similar to Fig. II, showing the low position strap;

Fig. IV is a view similar to Fig. III, showing a modified form of the invention;

Fig. V is an enlarged perspective view of the lens strap or holding means shown in Fig. IV;

Fig. VI is a sectional view taken on line VI—VI of Fig. IV and looking in the direction indicated by the arrows;

Fig. VII is a view similar to Fig. II showing another modified form of high position strap or lens holding means;

Fig. VIII is a view similar to Fig. VII showing another modified form of the invention;

Fig. IX is a fragmentary face view of the connecting means for uniting the spring sections with the main body portion of the lens strap shown in Fig. VIII; and Fig. X is a sectional view taken on line X—X of Fig. IX.

Much difficulty has been encountered in the past in fitting and securing the lens straps or holding means of rimless type ophthalmic mountings to the lenses and of preventing the said straps or holding means becoming loose and wabbly during use. One of the difficulties has been that of maintaining the parts in proper aligned and fitted relation with each other and of fitting the parts so that when the attaching means is placed in the aligned openings formed in the straps and lens that no strain will be imparted to the lens with a danger of causing it to become broken during use. Means have been provided, in the past, for resiliently taking up the looseness in play in lens holding means of this character but such means, due to the restricted size of such devices, were not sufficiently durable to produce a practical structure, that is, the resiliency of the resilient means would soon play out and permit the parts to loosen and move out of aligned relation with each other during use.

It, therefore, is one of the primary objects of this invention to provide resilient means for devices of this character which will take up the looseness or play in the connecting means to the lens and which will more or less permanently maintain a shock absorbing cushion connection with the lens and resiliently hold the parts in desired aligned relation with each other.

Another object of applicant's invention is to provide means for reinforcing the resilient means and, thereby provide a more permanent and durable construction.

Another feature is that of providing resiliency and flexibility both in the plane of the lens and in a plane normal to the lens so that shocks and strains may be absorbed in either direction.

Referring more particularly to the drawing wherein like characters of reference designate like parts throughout the several views, the improved holding means or strap 1 embodying the invention, as shown by one portion of Fig. I and in Fig. II, comprises a portion 2, which when viewed when the front is relatively straight, and has a temple connection 3 adjacent one end thereof and a bifurcated portion 4 adjacent its opposite end. The bifurcations of the portion 4 are adapted to engage with the front and rear surfaces of the lens 5 and are provided with openings aligned with an opening in the lens through which attaching means 7, such as a screw or other suitable means known to the art, is extended.

The lens holding means 1 is provided at the base of the bifurcation with an edge engaging member 6 which is normally rigid but of an adjustable nature. This lens edge engaging member, as shown in Fig. II, extends outwardly of the lens holding means at one side, preferably the lower side, and is so formed that it extends transversely to the longitudinal axis of the relatively straight portion 2 and lies at an angle thereto other than normal so as to fit the angle of the upper edge of the lens at the point of attachment of the holding means.

The portion 2, at the base of the bifurcated member, is recessed as shown at 8 to receive the sections 11 and 12, of the resilient lens edge engaging means 9. The resilient means 9 as shown in Figures I and II comprises three sections 11, 12, and 13 and each section is provided with an opening through which a projection 10 on the base of the bifurcation extends. The projection is headed over to secure the said sections in superimposed relation with each other and to attach them to the base. These various sections are of different lengths and are preferably of varied resiliency, the section 13 being preferably the longest section and more resilient than section 12. The said section 12 being likewise longer than the section 11 and more resilient than said section. Although applicant has shown and described only three sections of varying lengths and varying degrees of resiliency, it is to be understood that the amount of said sections may be varied, that is, increased or decreased and that the said sections may be made of material having substantially the same degree of resiliency if desired. The function of the resilient means 9 is similar to that of a leaf spring wherein a resilient section forms a backing support for another adjacent section. Attention is directed to the fact that the sections 11 and 12, attached in the recess 8 by the rivet or pin member 10, are held by the side walls of said recess against movement sidewise, and are thereby prevented from twisting out of aligned relation with each other during use. The inner walls of the bifurcated portion 4 also aid in preventing movement of the sections sidewise during use. The connecting means 7 which holds the lens holding means 1 in secured relation with the lens 5 is fitted during the assembling of the parts so as to have a predetermined amount of looseness and play to permit the said holding means to move about the said connecting means as a center during use. This looseness and play, however, is such as to prevent movement of the lens holding means in a plane normal to the plane of the lens, that is, the movement of the holding means about the pivot 7 in this instance is entirely in the direction of the plane of the lens. It is apparent that by adjustment of the member 6 outwardly or inwardly relative to the peripheral edge of the lens, the tension of the resilient means 9 may be varied and the position of the lens holding means relative to the lens may be varied, that is, the longitudinal axis of the portion 2 may be varied with respect to the horizontal meridian of the lens so that the said portion may be placed in parallel or other desired relation with the horizontal meridian of the lens to produce a pleasing streamline effect transversely of said lens. The resilient means 9 provides means for taking up the looseness and play in the connection of the lens holding means to the lens and also provides means for absorbing shocks and strain on the lens during the use of the mounting. This arrangement obviates the necessity of having to closely associate and fit the parts with each other prior to placing the connecting means 7 in the aligned openings, and thereby greatly decreases the difficulties usually encountered in the past, in fitting and assembling holding means of this nature with the lenses.

In Fig. III the lens holding means 14 is provided with resilient means 15 formed of a plurality of sections 16, 17, and 18, of varying lengths and which extend outwardly of both sides of said holding means. The lens holding means 14 is attached to the lens by connecting means 19 placed through aligned openings in a similar manner to the connecting means 7 described above. The resilient sections 16, 17, and 18, are provided with aligned attaching openings through which a projection 20 at the base of the bifurcation of the lens holding means extends and which is headed over to secure the sections to said base. The different sections may be varied in resiliency or may be of the same resiliency as desired, preferably being varied with the section 16 more rigid than the section 17 and the section 17 more rigid than the section 18. The lens holding means in this instance is of such a nature that it may be moved upwardly and downwardly in the plane of the lens about the connecting means 19 as a center and provides shock and strain absorbing means in both directions. The resilient means 15 in this instance also takes up the looseness in play of the connecting means and also acts as shock and strain absorbing means. It also tends to maintain the lens holding means 14 in proper aligned relation with the lens, that is, if deflected upwardly or downwardly about the connecting means 19, it will always tend to return to its initial set.

In Figures IV to VI, inclusive, there is shown another modification of the invention wherein the lens holding means is formed of a plurality of resilient sections forming the lens face engaging means and lens edge engaging means. The holding means in this instance is provided with face engaging portions 21 having overlying portions 22 and 23 forming resilient backing members for said face engaging portions, and also has a resilient edge engaging portion 24 and overlying portions 25 and 26 forming resilient backing means for said edge engaging portion. The various portions are placed in superposed relation with each other and are each provided with an opening 40 through which a projection 27 extends and which is headed over to secure the sections in assembled superimposed relation with each other. The face engaging portions 21 are provided with openings aligned with an opening in the lens through which connecting means 28 extends to secure the said face engaging portions to the lens. The connecting means in this instance being preferably of a telescoping tube and pin type secured together by soft solder or other suitable means, after the parts have been assembled, by subjecting them to heat. Referring more particularly to Figures IV and VI, it will be seen, as indicated by the arrows 30 and 31, that the lens holding means is resiliently supported so that it may be moved both in the plane of the lens and in a direction transversely of the plane of the lens. The overlying portions 21, 22 and 23 may be varied in resiliency with the portion 22 more rigid than the portion 21, and the portion 23 more rigid than the portion 22 or may be all of substantially the same resiliency if desired. This also is true of the overlying portions 24, 25, and 26. The portion 26 being more rigid than the portion 25 and the portion 25 more rigid than the portion 24. Attention is directed to the fact that the lens face engaging portions 21 are spaced from the front and rear surfaces of the lens as illustrated at 32 to provide clearance so that the holding means may be moved sidewise with respect to the lens. The tendency of the various resilient sections to return to their initial set when flexed and released tends to maintain the parts in proper relation with each other and also tends to maintain the holding means in proper aligned and fitted relation with the lens. It is apparent that due to the fact that the lens face engaging portions 21 are of a resilient nature, the said portions will easily fit themselves to lenses of different thicknesses without the usual difficulty of having to bend and adjust the said portions as has been usual with lens holding means of this nature in the past, and will more or less maintain a close fit with the lens during use. The resiliency of the various sections provide shock and strain absorbing means in all directions and also provide means of taking up the looseness and play in the connecting means to the lens. Although resilient they are of sufficient rigidity to support the parts in proper fitted and aligned relation with each other during use. The tube and pin members of the connecting means 28, which are connected by soft solder means when the parts are in proper fitted and aligned relation with each other, provide means whereby a predetermined amount of looseness and play may be allowed between the holding means and the lens during use. This permits the various resilient sections to function properly without danger of having the looseness of the parts increase during use as would be the case if a screw type connection were used, such as those commonly used in the prior art.

Referring more particularly to Fig. VII, there is shown another modified form of the invention wherein a high position strap such as that shown in Fig. II is so constructed as to flex downwardly or upwardly in the plane of the lens during use. This is accomplished by providing the lens holding means with an upwardly extending support 33 to which the resilient edge engaging means 34 is attached by a headed pin member 35. Attention is directed to the fact that the point of attachment of the resilient means 34 is in this instance on a line 36 which is substantially normal to a line tangent with the edge of the lens at the location of the holding means on the lens and which extends substantially through the axis of the point of attachment of the connecting means 37 to the lens. This provides the resilient means 34 with substantially equal edge bearing surface on the opposite sides of the point of attachment 37 so that when the lens holding means is moved about said point of attachment as a center the resilient means 34 will function substantially equally on both sides of said point. The lens holding means in this instance is provided with a portion 38 similar to the previously described portion 2 and which lies substantially parallel with the horizontal meridian of the lens to produce a pleasing streamline effect across the lens. The resilient means in this instance is similar to that shown in Fig. III but it is to be understood that the said lens holding means may be formed in a manner similar to that shown in Figures IV to VI inclusive, if desired, it merely being necessary to alter the shapes of the parts so that they will be similar to those shown in these figures and to move the point of attachment or center of the resilient edge engaging portion up to the location of the line 36 which, as stated above, is normal to a line tangent with the edge of the lens at the location of the holding means on the lens.

In Fig. VIII there is shown another modified form of high position strap similar to that shown in Fig. VII, only in this instance instead of extending all of the superimposed spring sections both upwardly and downwardly similar amounts on opposite sides of the attaching means 43, the sections 41 and 42 extend upwardly only of the point of attachment 43. In this instance the normally relatively short backing member or section 44 is provided with an elongated downwardly extending spring portion 45 forming the lower lens edge engaging means. The spring portion 45 is preferably of a tension substantially equal to the combined tension of the sections 41 and 42 so as to substantially equalize the lens edge engaging pressure on the opposite sides of the point of attachment 46 of the lens strap to the lens.

Attention is directed to the fact that in this instance the attaching means 43 for securing the various sections 41, 42, and 44 to the lens holding means is not positioned on a line substantially normal to a line tangent with the edge of the lens at the location of the holding means on the lens, and which extends substantially through the axis of the point of attachment of the connecting means 46 to the lens, but the related positions and dimensions of the superimposed sections 41, 42 and 44 are such as to provide substantially equal resiliency on the opposite sides of the point of attachment 46. The alignment of the holding means on the lens may be varied by the proper adjustment of the spring section 45. If desired, however, the point of attachment 43 could be positioned on a line normal to a line tangent with the edge of the lens and extending through the point of attachment 46 in a manner similar to that shown in Fig. VII.

The spring sections 41 and 42 may be of equal resilience or may be varied in resilience, as desired, that is, the section 42 may be made more rigid than the section 41 in a manner similar to that shown and described in connection with the above figures of the drawing.

Attention is directed to the fact that in both of the lens straps shown in Figs. VII and VIII there is a clearance provided in the rear of the lower resilient means as indicated at 47, to provide means whereby the lower portions of the resilient means may be free to be flexed towards or away from the edge of the lens.

Although the lens face engaging portions and resilient lens edge engaging portions are in this instance formed separately of each other, it is to be understood that the edge and face engaging portions may be formed resilient and integral and with superimposed backing portions in a manner similar to the various sections shown in Fig. V.

In Figs. IX and X there is shown an enlarged fragmentary view of the connecting means 43 which extends through aligned openings in the superimposed resilient sections 41, 42, and 44. The connecting means 43 is in the form of a rectangular pin having a reduced portion 48 adjacent one end thereof secured by solder or other suitable means to an opening in the body portion 49 of the lens strap, and having projections 50 adjacent its opposite end which during the assembling of the superimposed resilient sections are adapted to be pressed to lie within beveled transverse edges 51 formed in the resilient section 41. During the pressing operation the pin member 43 is compressed, forcing the body portion of the pin into rigid engagement with the side walls of the openings in the superimposed sections 41, 42, and 44, rigidly securing them to the body portion 49 of the lens strap and eliminating all looseness and play in the connection.

The purpose of providing a rectangular shaped pin, the greater width of which extends in the direction of the longitudinal axis of the superimposed sections, is to provide means whereby the width of the portions 52 on the opposite sides of the connecting pin 43 will not be so reduced as to cause them to be weakened to a degree wherein they will not provide a positive and permanent connection and permit the various resilient sections to function properly. That is, the rectangular shape of the pin 43 permits forming these sections to a greater width than has been usual in the past. This also provides a longer bearing surface and thereby prevents displacement of the alignment. The portions pressed into engagement with the beveled walls 51 provide means for anchoring the resilient means in the direction of flexing thereof, and thereby provides a positive and durable attachment.

Although this type of connecting pin is shown and described as being used in connection with the lens holding means illustrated in Figs. VIII to X inclusive, it is to be understood that it may be applied to any of the structures disclosed herein.

In all of the above described structures it is apparent that applicant has provided resilient means incorporating a plurality of sections forming resilient backing supports for each other and which may be regulated as to their tension by controlling their lengths and thicknesses. This type of resilient means overcomes most of the difficulties encountered in prior art lens holding devices of this nature in that it is more durable and maintains a snug and permanently resilient connection with the lens during use. In some of the structures shown the resiliency is provided both in the plane of the lens and in a plane normal thereto, so that the lens holding means will be free to flex and absorb strain and shocks in both directions. Although this type of strap is shown and described as being for use at a position located substantially along the horizontal meridian of the lens, it is apparent that such a structure may be applied to a high position strap by the procedure which has been previously set forth.

From the foregoing description it will be seen that I have provided simple, efficient and economical means and methods of obtaining all of the objects and advantages of the invention.

Having described my invention I claim:

1. In an ophthalmic mounting, a lens, a lens strap having a body portion and a pair of arms to extend along opposite sides of the lens, means extending through the lens and arms for pivotally connecting the strap to the lens, and a plurality of separate springs positioned one overlying the other with the spring nearest the lens at least as long in a direction following the edge of the lens as any other of said springs and held in compression between said body and lens and tending to move said body away from the edge of the lens, although permitting rocking movement of the lens about said pivotal connection, said springs being arcuate when free from said compression.

2. In an ophthalmic mounting, a lens, a lens strap having a body portion and a pair of arms to extend along opposite sides of the lens, said body having a dimension along the edge of the lens no greater than the largest dimension parallel thereto across one of said arms, means extending through the lens and arms for pivotally connecting the strap to the lens, and a plurality of separate springs positioned one overlying the other with the spring nearest the lens as long in a direction following the edge of the lens as any other of said springs and held in compression between said body and lens and tending to move said body away from the edge of the lens, although permitting rocking movement of the lens about said pivotal connection, said springs being arcuate when free from said compression.

3. In an ophthalmic mounting, a lens, a lens strap having a body portion and a pair of arms to extend along opposite sides of the lens, said body presenting a face toward the lens in a single plane and having a dimension in the same direction as the adjacent edge of the lens no greater than the largest dimension parallel thereto across one of said arms, means extending through the lens and arms for pivotally connecting the strap to the lens, and a plurality of separate springs positioned one overlying the other with the spring nearest the lens as long in a direction following the edge of the lens as any other of said springs and held in compression between said body and lens and tending to move said body away from the edge of the lens, although permitting rocking movement of the lens about said pivotal connection, said springs being arcuate when free from said compression.

4. In an ophthalmic mounting, a lens, a lens strap having a body portion and a pair of arms to extend along opposite sides of the lens, said body presenting a face toward the lens in a single plane, which plane is tangent to an arc described from the pivotal connection between said strap and said lens at a point located midway between the upper and lower edges of said arms, the dimension of said face in the same direction as the adjacent edge of the lens being no greater than the largest dimension parallel thereto across one of said arms, means extending through the lens and arms for pivotally connecting the strap to the lens, and a plurality of separate springs positioned one overlying the other with the spring nearest the lens as long in a direction following the edge of the lens as any other of said springs and held in compression between said body and lens and tending to move said body away from the edge of the lens, although permitting rocking movement of the lens about said pivotal connection, said springs being arcuate when free from said compression.

5. In a device of the character described for use with a lens having a predetermined edge contour and an attaching opening therein for lens securing means, a lens holding member having an edge portion and a lens face engaging portion having an attaching portion for pivotal connection with the lens by securing means extending within the opening in the lens, said edge portion including a plurality of separate springs positioned one overlying the other with the spring to be positioned nearest the lens at least as long in a direction following the edge of the lens as any other of said springs and held in compression between said edge portion and lens and tending to move said edge portion away from the edge of the lens, although permitting rocking movement of the lens about said pivotal connection, said springs being arcuate when free from said compression.

6. In a device of the character described for use with a lens having a predetermined edge contour and an attaching opening therein for lens securing means, a lens holding member having an edge portion and a lens face engaging portion having an attaching portion for pivotal connection with the lens by securing means extending within the opening in the lens, and a plurality of superimposed resilient members of varying lengths secured intermediate their ends to said edge portion of the lens holding member and held in compression between said edge portion and lens and tending to move said edge portion away from the edge of the lens, although permitting rocking movement of the lens about said pivotal connection, said springs being arcuate when free from said compression.

7. In a device of the character described for use with a lens having a predetermined edge contour and an attaching opening therein for lens securing means, a lens holding member having an edge portion and a lens face engaging portion having an attaching portion for lens securing means to be fitted on the lens with the attaching portion overlying the attaching opening in the lens whereby the lens holding member may be pivotally secured to the lens, said edge portion including a plurality of separate springs of varying degrees of resiliency positioned one overlying the other and held in compression between said edge portion and lens and tending to move said edge portion away from the edge of the lens, although permitting rocking movement of the lens about said pivotal connection, said springs being arcuate when free from said compression.

8. In a device of the character described for use with a lens having a predetermined edge contour and an attaching opening therein for lens securing means, a lens holding member having an edge portion and a lens face engaging portion having an attaching portion for pivotal connection with the lens by securing means extending within the opening in the lens, said edge portion having a dimension in the direction which is to extend along the edge of the lens no greater than the largest dimension parallel thereto and across the lens face engaging portion, and a plurality of separate springs positioned one overlying the other with the spring which is to be positioned nearest the lens as long in a direction following the edge of the lens as any other of said springs and adapted to be held in compression between said edge portion and lens and to tend to move said edge portion away from the edge of the lens, although permitting rocking movement of the lens about said pivotal connection, said springs being arcuate when free from said compression.

9. In a device of the character described for use with a lens having a predetermined edge contour and an attaching opening therein for lens securing means, a lens holding member having an edge portion and a lens face engaging portion having an attaching portion for pivotal connection with the lens by securing means extending within the opening in the lens, said edge portion having a face which is to lie towards the lens in a single plane and having a dimension in the direction which is to extend along the edge of the lens no greater than the largest dimension parallel thereto across the lens face engaging portion, and a plurality of separate springs positioned one overlying the other with the spring nearest the lens as long in a direction which is to follow the edge of the lens as any other of said springs adapted to be held in compression between said edge portion and lens and to tend to move said edge portion away from the edge of the lens, although permit rocking movement of the lens about said pivotal connection, said springs being arcuate when free from their compression.

10. In a device of the character described for use in combination with a perforated lens, a lens holding member having a portion to overlie the edge of the lens and a portion to engage a face of the lens and be pivotally secured to said lens by connecting means extending within the perforation in the lens, said portion overlying the edge of the lens including a relatively rigid but pliable part extending outwardly on one side only of said portion which is to overlie the edge of the lens and which is adapted to engage the edge of said lens and a plurality of resilient members secured to said portion which is to overlie the edge of the lens and extending outwardly of the side thereof opposite the relatively rigid but pliable part and being adapted to engage the edge of the lens on said side.

11. In a device of the character described for use in combination with a perforated lens, a lens holding member having a portion adapted to overlie the edge of the lens and a portion adapted to overlie a face of the lens and be pivotally connected to said lens by connecting means extending within the perforation of the lens, said portion overlying the edge of the lens having a part cut away to form a pocket therein and a relatively rigid but pliable part extending outwardly only on one of its sides and being adapted to engage the edge of the lens on said side and resilient means having a portion thereof secured in the pocket and a portion extending outwardly of said portion which is to overlie the edge of the lens on the side thereof opposite the relatively rigid but pliable part and being adapted to engage the edge of the lens on said side.

12. In a device of the character described for use with a lens having a predetermined edge contour and an attaching opening therein for lens securing means, a lens holding member having an edge portion for engagement with the edge of the lens and a lens face engaging portion having an attaching portion for lens securing means to be fitted on the lens with the attaching portion overlying the attaching opening in the lens for pivotal connection with the lens, said edge portion and lens face engaging portion having portions thereof formed resilient with at least one of said resilient portions comprising a plurality of resilient sections.

13. In a device of the character described for use with a lens having a predetermined edge contour and an attaching opening therein for lens securing means, a lens holding member having an edge portion and a lens face engaging portion having an attaching portion for lens securing means to be fitted on the lens with the attaching portion overlying the attaching opening in the lens, said edge portion and lens face engaging portion having portions thereof formed resilient with each of said resilient portions comprising a plurality of superimposed resilient sections.

14. In an ophthalmic mounting, a lens having an attaching opening therein at a given distance from its edge, a lens holding member having a supporting portion overlying the edge of the lens and a portion overlying a face of the lens and having an attaching portion pivotally secured to the lens by connecting means extending within the opening in said lens, said portion overlying the face of the lens being formed to such a length as to space the attaching portion and edge portion of the lens holding member a distance apart greater than the distance between the opening and the edge of the lens, and a plurality of superimposed resilient members secured to said portion overlying the edge of the lens which are cupped so that the ends of at least one of said resilient members will engage the edge of the lens to compensate for the difference in the distance between the said spaced attaching portion and edge portion and the distance between the opening and the edge of the lens, whereby the said lens holding member may be positioned on the lens and the attaching portion moved to alignment with the opening in the lens by compressing and displacing a portion of said resilient members relative to the remainder of said members and be pivotally secured to the lens with the parts held in this position.

EDWARD M. SPLAINE.